Figure 1:
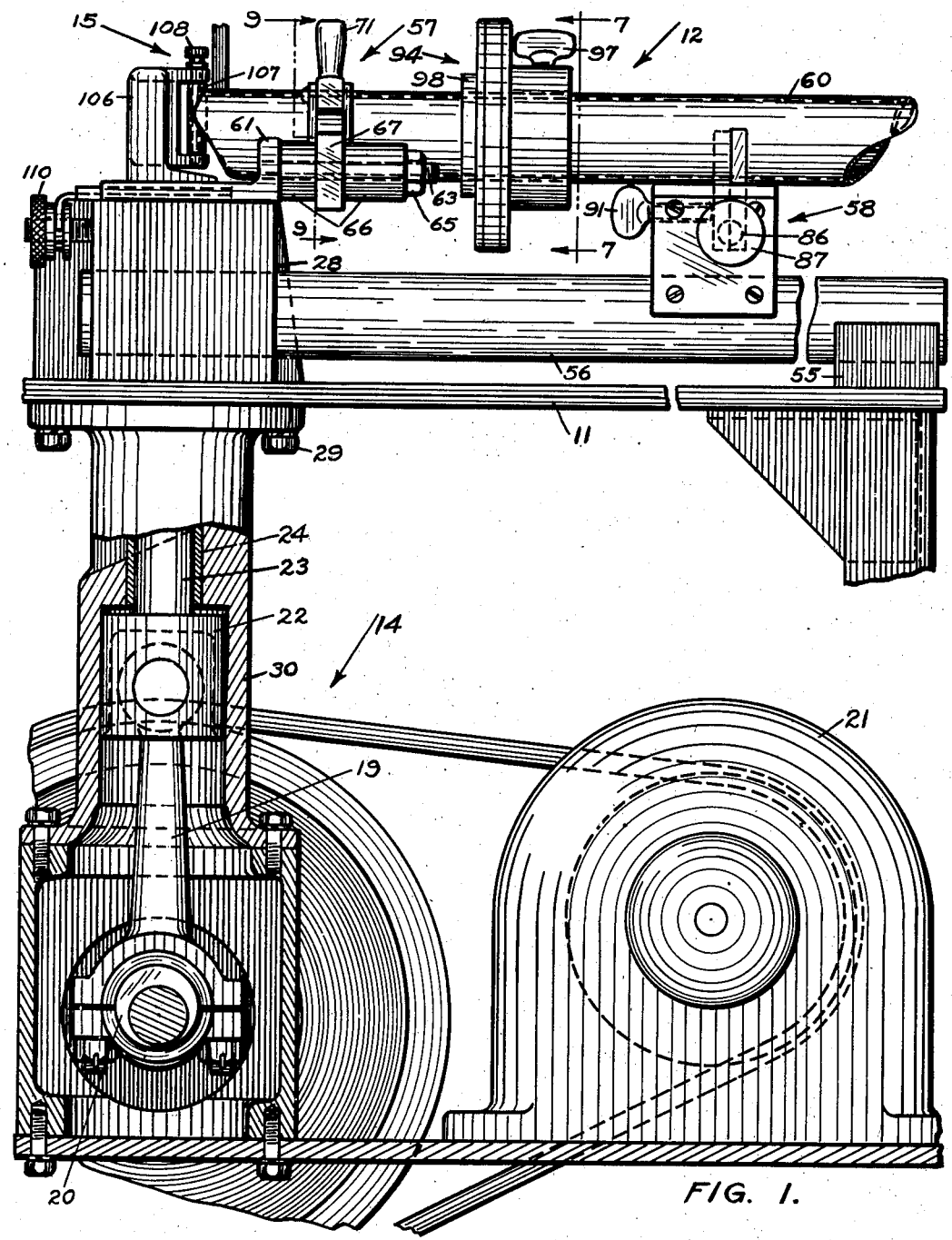

PAUL R. POWELL, INVENTOR.
BY Alfred J. Jacobi

July 2, 1946.    P. R. POWELL    2,403,119
MACHINE TOOL
Filed Dec. 14, 1943    5 Sheets-Sheet 2

PAUL R. POWELL, INVENTOR.
BY Alfred J. Jacobi

July 2, 1946.　　P. R. POWELL　　2,403,119
MACHINE TOOL
Filed Dec. 14, 1943　　5 Sheets-Sheet 3
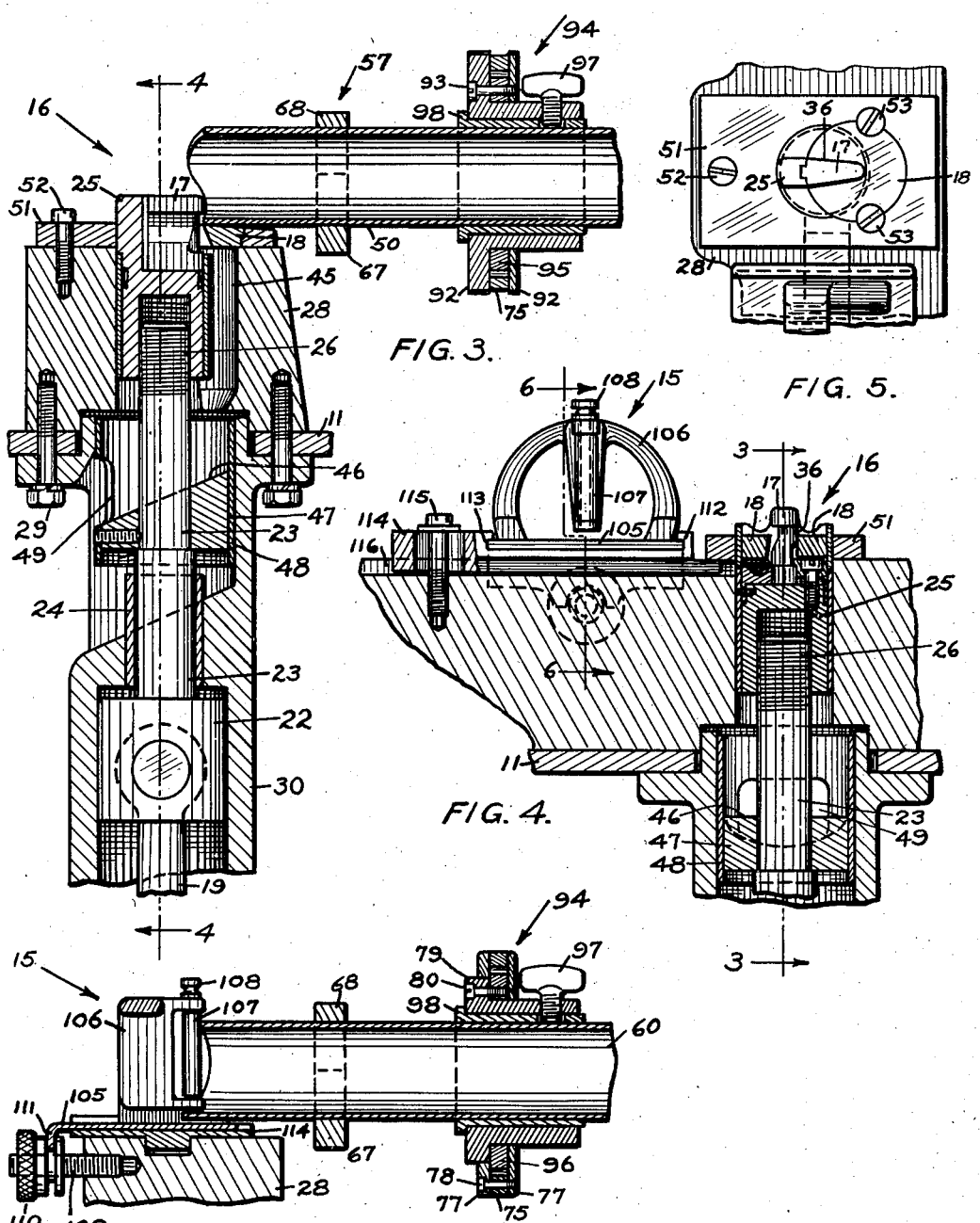
PAUL R. POWELL, INVENTOR.

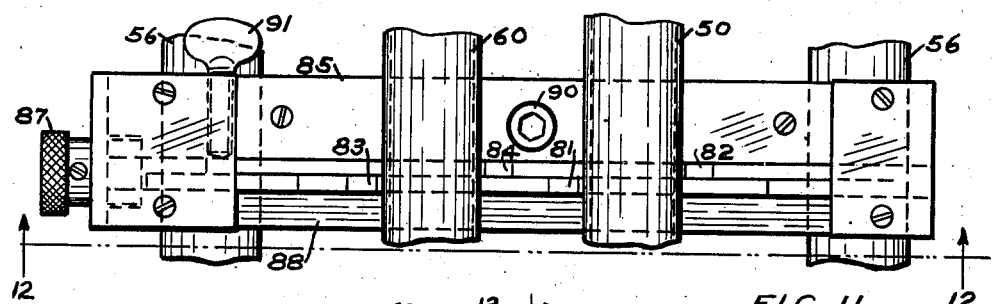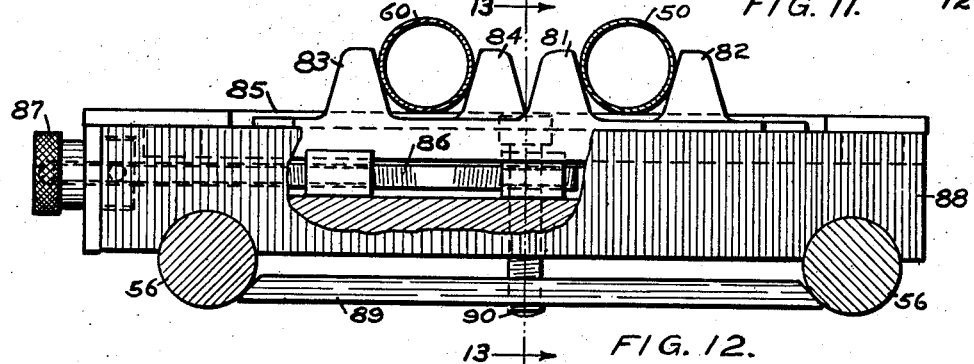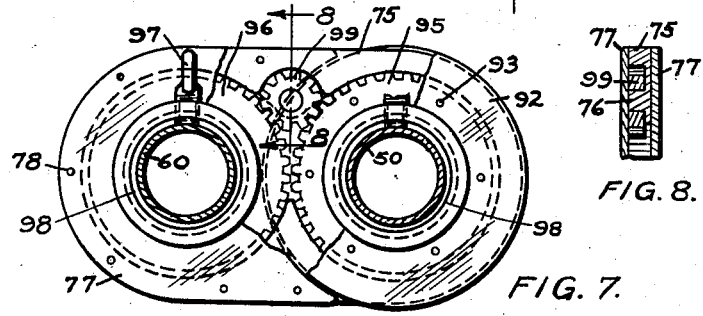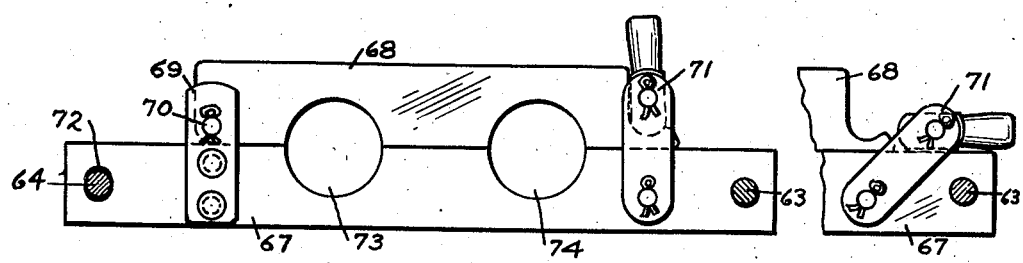
PAUL R. POWELL, INVENTOR.
BY Alfred J Jacobi

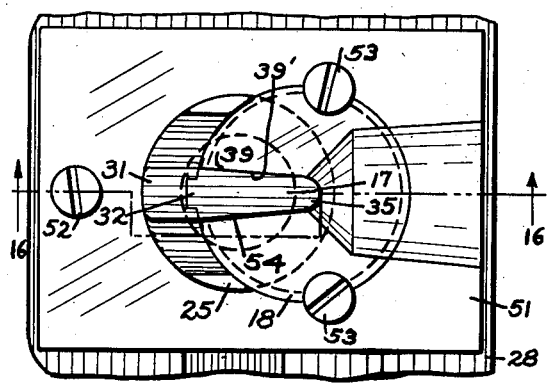

Patented July 2, 1946

2,403,119

UNITED STATES PATENT OFFICE 2,403,119

MACHINE TOOL

Paul R. Powell, Baltimore, Md.

Application December 14, 1943, Serial No. 514,255

13 Claims. (Cl. 164—47)

This invention pertains to the art of machine tools, and more particularly to the art of machining a plurality of pieces of like dimensions.

The invention comprises a method and apparatus for machining successive pieces of work to the same contour. More particularly, it comprises a machine operable to machine a number of successive work pieces each to a contour which is predetermined by a templet.

In the machine of the invention, the contour of the templet is preferably the same as the predetermined desired contour of the work piece. Thus, a piece of work which has previously been machined to the desired contour can be operated in the machine as the templet. The machine is capable of machining a piece of work to a predetermined contour under manual control, which piece is thereafter available to be operated in the machine as a templet to control the machining of one or more other like pieces successively to the desired contour.

The machine of the present invention, it will be readily understood, is primarily a production machine, but it is also operable as a model making machine. To persons skilled in the art of model making it is well understood that, in spite of the most careful and skillful calculations of size, shape and dimensions, a model will frequently turn out to be inaccurate in one or more particulars. It is then necessary to rework the piece, or make new piece, in order to produce one machined to the desired contour. In the case of a piece to be incorporated in an assembly, for example, the model will often fail to fit because of one or more dimentions being off a greater or less amount. Reworking and revisions are then necessary, usually by a cut and try method, until a model is made to fit with the desired degree of accuracy.

The machine of the present invention is able to machine models to the desired contour more easily, more accurately, and at less cost, than is possible under the prior art practice. Furthermore, minor inaccuracies in the model can be readily compensated for. The machine is equipped with means, adjustable when the contour of the templet is found inaccurate, to machine work pieces accurately to the desired contour under control responsive to the inaccurate templet.

Although the invention is of broader scope, the machine of the disclosed embodiment is constructed primarily for machining elongated structural stress members, such as beams, struts, stay rods, and the like. In the art of aircraft such members are positioned to intersect with members they are joined with, their end surfaces being attached, by welding or some similar means, in surface to surface engagement with the member intersected. Aircraft stress members are commonly constructed of lengths of tubing. Each end surface of a tubing member is machined to a contour to fit the surface of engagement with the one or more members it intersects. The contour of surface engagement at an end of a stress member tubing is determined by the contour of the surface intersected, and the angle of approach of the tube to the surface. The machine of the present invention operates to machine each end of the tube length to the contour dictated by the intersected surface, to fit precisely in contact therewith.

Usually both ends of a piece of tubing must be machined, each to fit a surface of intersection. Accordingly, the tubes must be machined not only to correct contours at respectively opposite ends, but they must be machined to proper lengths, and contours at opposite ends of a given tube length must be disposed in correct relative circumferential registry.

The machine of the disclosed embodiment of the invention is adapted to attain desired contours of end surfaces easily and in a novel manner. Much of the prior art cut and try practice to attain a properly fitting piece, and the remaking of models to replace spoiled pieces, is avoided. When the contour of the model is found not entirely accurately cut to fit, the machine can be adjusted to machine subsequent tube ends to accurate contours, using the inaccurately machined model as a templet. When machining of opposite ends of the model tube is found somewhat out of accurate circumferential registry, the machine can be adjusted to machine the ends of the next tube to accurate circumferential registry using the inaccurate model as the templet. If the length of the model is found to be inaccurate, the machine can be adjusted to machine subsequent tubes accurately to desired lengths using the inaccurate model as a templet.

The machine of the disclosed embodiment includes a machining tool which presents a new result in the combination of the machine, and which embodies novelty, per se. The construction of the new tool embodies principles not found in tools of the prior art. The machining tool comprises companion male and female dies, constructed to afford advantages in strength, stress resistance, and cutting action, which advantages will be fully understood from the hereinafter detailed description of the structure.

Having described the general nature of the invention, attention is now directed to the accompanying drawings for a fuller understanding thereof. In the drawings—

Figure 2:
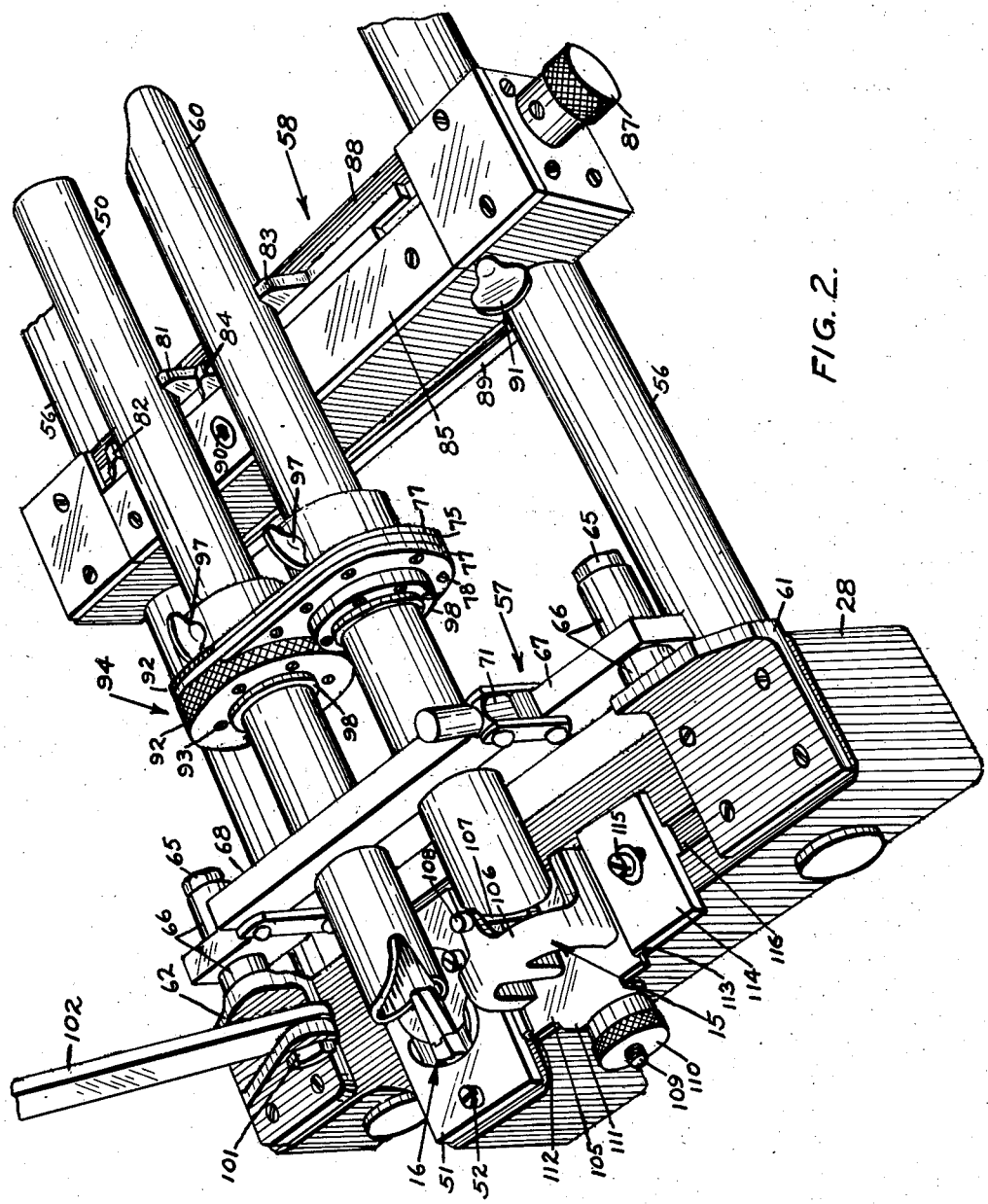

Figure 1 present a front elevation of a machine embodying the present invention, with parts broken away for clearness of illustration, Figure 2 is a view in perspective of the top of the machine, directed to the working head, Figure 3 is a cross-sectional elevation of the machining tool, taken through its center plane longitudinally of the machine, on line 3—3 of Figure 4, Figure 4 is a cross-sectional elevation taken on line 4—4 of Figure 3, Figure 5 is a cut away plan view showing the machining tool, Figure 6 is a cross-sectional elevation, taken on line 6—6 of Figure 4, through the center plane of the templet, and longitudinally of the machine, Figure 7 is an elevation of the intergearing between the templet and the work, with parts broken away, the view being indicated by line 7—7 in Figure 1, Figure 8 is a detail cross-section, taken on line 8—8 of Figure 7, Figure 9 is a cross-sectional elevation taken on line 9—9 of Figure 1, Figure 10 is a fragmentary view of the latch of Figure 9 in open position, Figure 11 is a fragmentary plan view illustrating the tail rest, Figure 12 is a cross-sectional elevation taken on line 12—12 of Figure 11, with parts broken away for clearness of illustration, Figure 13 is a cross-sectional elevation taken on line 13—13 of Figure 12, Figure 14 is a fragmentary plan view illustrating the machining tool, Figure 15 is a fragmentary cross-section taken on line 15—15 of Figure 16, Figure 16 is a fragmentary cross-sectional elevation taken on line 16—16 of Figure 14, Figure 17 is a cross-sectional elevation taken on line 17—17 of Figure 16, Figures 18 and 19 are perspective views, from the left and right respectively, of the male die; and Figure 20 is a perspective view, illustrating a modified form of machining tool.

The machine of the drawings presents one practical application of the principles of the invention. It comprises the bed plate 11, Figure 1, which carries the working head generally illustrated at 12. See also Figure 2. The working head 12 is operated by the driving mechanism, generally illustrated at 14.

The working head comprises the machining tool, which operates to machine the work, and illustrated generally at 16, Figure 2. The working head also includes means operative to control the machining operation, illustrated generally at 15, the control mechanism being located generally forwardly of the machining tool, as shown.

The machining tool 16, of the disclosed embodiment, comprises the companion male and female dies, 17 and 18, respectively, Figures 3, 4, 5 and 16, the male die being reciprocated in the female die to perform the cutting operation. The male die is reciprocated by the driving mechanism 14, Figure 1, which comprises the connecting rod 19, driven through the crank 20, by the motor 21. The connecting rod 19 actuates the reciprocating head 22, which is fixed to the tool carrying shank or arm 23, Figure 3, longitudinally slidable in the bushing 24. The bushing is held fixed within the supporting leg 30 for the bed plate 11, which also houses the reciprocating mechanism, as shown.

The tool attaching head 25 is removably attached to the arm 23 by the screw threads 26. The head 25 is reciprocated in the head stock 28. The head stock rests on the bed plate 11, held in position by the screws 29, which locate and fix the reciprocating mechanism housing 30, the bed plate 11, and the head stock 28, relatively positioned. See Figure 3.

The tool holding head 25, is enlarged as shown, to provide an ample mass of metal to support the shock strains of the cutting operation. It includes the extension 31, which provides a backing support for the cutter 17, Figures 14, 15 and 16. The companion key and keyway 32, between the extension 31 and the cutter 17 operate to locate the cutter properly disposed to perform its function.

The cutter, shown in detail in Figures 18 and 19, is symmetrically constructed to present pairs of shear edges at opposite ends, which are usable interchangeably. By reversing the tool 17 in the head 25, either one or the other of the shearing edges 36, 37 can be positioned for operation.

The cutter comprises the nose 35, projected laterally of the axis of the head 25; the nose being rounded to a predetermined curvature, Figure 14. The nose presents the overhanging shearing edge 36. The side cutter, comprising the additional overhanging shearing edge 37, is continuous with the shearing edge 36 of the nose, extending therefrom transversely of the axis of the tool actuating arm 23, and beyond it.

The shear edge 36, 37 is directed downwardly towards the actuating arm 23, whereby the working stroke is the pulling stroke of the arm 23.

As will be clear from Figure 16, the shearing edge 36, 37 is canted at an angle directed downwardly from the nose 35, which contributes to the distribution of the cutting shock. During the cutting stroke, contact is made with the work first at a point along the shear edge 37 near the axis of the shank 23. Contact progresses along the shearing edge 37 away from the axis of the arm 23 towards the nose 35, the cut being completed by the rounded edge 36. The shock of the cutting operation is thus distributed along the shearing edge 36, 37.

Another object of the elongated shearing edge 36, 37 is to provide an extended mass of metal to withstand the shock of the cutting operation. The metal mass being extended longitudinally, a lesser thickness of metal is required longitudinally of the stroke to back the shear edge 36, 37, and accordingly the cutting edge is located closer to the end of the cutter 17. This enables tubing of smaller diameter to be machined.

The nose of the cutter 35 is directed away from the axis of the shank 23, transversely thereof towards the work piece 50, and in the case of the work piece being tubing, as shown, the nose is projected into the end of the tubing, directed longitudinally thereof. The elongated shear edge 36, 37, and the correspondingly thinner mass of metal backing the shear edge, permits the smallest standard size stress tubing to be machined by the disclosed machine of the present invention.

The duplicate sets of shear edges 36, 37, at tively, are positioned on the plate 85, and when so positioned the knurled knob 87 is rotated to close the pairs of jaws 81, 82 and 83, 84 into engagement with the work and templet pieces. When adjustment is made, the jaws are held in adjustment by the set screw 91.

The pairs of jaws 81, 82 and 83, 84 are spaced apart the same distance as the holes 73 and 74 of the head rest 57, whereby the work and templet pieces 50 and 60 are held in parallel relationship, the spacing being the same as the distance between the cutter 17 and the templet follower 107.

To operate the machine, it is first used to machine a model. A head rest 57 with the proper sized holes 73 and 74 for the given tube size is selected. The head rest is adjusted to the preferred spacing from the cutter 17, by means of the bushings 66, and the tail rest 58 is adjusted to the proper position along the parallel ways 56 for the tubing length. A tube of proper size and length is now placed clamped in the hole 73 by means of the latch 71, and knurled knob 87 is rotated to adjust the jaws 81, 82 into engagement with the tube. The cutter 17 is now set in operation driven by the motor 21, and the tube 50 is slid longitudinally in the hole 73 until it comes into machining engagement with the cutter. The tube 50 is manipulated manually to machine its ends to the desired contours. It is slid longitudinally in the hole 73 to attain the desired depth of cut longitudinally of the tube, and it is rotated to attain the desired circumferential contour, rotation being towards the operator, or in the clockwise direction in Figure 2. When one end of the tube has been machined to the desired contour, the tube is reversed in the hole 73, and the other end of the tube is machined in a similar manner to its desired contour.

It will be noted that the tube can be readily removed from and replaced into the machine to try it for fit, by sliding it out of and into the hole 73. Thus, complex contours can be attained to a high degree of accuracy with a minimum of work.

The machined tube 50 is now positioned to become the templet tube 60, by being positioned in the hole 74 of the head rest 57. A new tube 50 is positioned in the hole 73 as a work piece. Preparatory to being so positioned in the machine, the work and templet pieces 50 and 60, respectively, are intergeared to rotate in unison, the intergearing 94, Figures 2, 3, 6 and 7, being provided for this purpose.

The intergearing, illustrated generally at 94, comprises the gear 95, attachable to the work piece 50, and the gear 96, attachable to the templet tube 60. Adaptor bushings 98 of various required sizes are provided to adapt the gears 95 and 96 to tubing of any desired size. The gear ratio between the gears 95 and 96 is 1 to 1, and the drive is through the idler pinion 99, whereby, when either tube 50 or 60 is rotated in its hole 73 or 74, respectively, the other tube is rotated to the same extent in the same direction.

The gears 95 and 96 are enclosed in a housing, comprising the inside plate 75, which spaces the tubes apart the distance predetermined by the distance between the cutter 17 and the templet follower 16. The inside plate 75 provides a journal bearing for each of the gears 95 and 96, and a bearing pin 76 for the idler pinion 99. The cover plates 77 complete the housing of gear 96, in the manner illustrated in Figure 7, being attached to opposite faces of the inside plate 75 by screws 78. See also Figures 2 and 6. The gear 96 is attached to the bushing 79, as illustrated in Figure 6, by means of screw 80, the bushing 79 providing a flange, as shown, for attaching the gear 96 to the templet tube 60, by means of the set screw 97, which passes through the adaptor bushing 98, keying it to the bushing 79 and the gear 96.

The knurled nut 92 is disposed on both faces of the gear 95, as illustrated in Figure 3, to complete the housing thereof, and of the pinion 99. See also Figures 2 and 7. The knurled nut 92 is fixed to the gear 95, by screw 93, to rotate therewith in thrust bearing engagement with the inside plate 75. The knurled nut 92 provides a flange to attach the gear 95 to the tubing 50 by means of the set screw 97, Figure 3, which passes through the adaptor bushing 98, keying it to the gear 95.

Now referring to Figure 2 it will be noted that, when the knurled nut 92 is rotated manually, the rotation is transmitted to the tube 50. This operates to rotate the tubes 50 and 60 in like directions to the same extent, through the intergearing 94.

The tubes 50 and 60, with the intergearing 94 attached to them and attaching them together, constitutes a unit. Preparatory to placing them in operative position in the machine, the ends of the tubes are adjusted in alignment.

Mounted to pivot at 101 on the bracket 62, Figure 2, is the locating bar 102, which can be swung down across the ends of the tubes 50 and 60. With the ends of both tubes in engagement with the bar 102, the tubes are in proper relative position, and the intergearing 94 is fastened in position by tightening the set screws 97. The bar 102 is canted at a slight angle, to make the tube 50 project slightly further than tube 60, to allow for machining. When adjustment has been made, the bar 102 is lifted to inoperative position shown in Figure 2, and the machine is ready to machine the ends of tube 50 to the same contour as the ends of the previously machined tube 60. The templet follower 15, illustrated in detail in Figure 6, and now to be described, is provided for the purpose.

The templet follower comprises the plate 105, Figures 2, 4 and 6, which supports the upright bracket 106. The bracket 106 carries the roller 107, rotatably mounted on the pin 108. The roller 107 preferably has the same radius as the radius of curvature of the nose 35 of the cutter 17, and the surface of the roller 107 lies in the same vertical plane transversely of the machine as the tip of the nose 35. This causes the machining of the end of the tube 50 to be an exact reproduction of the contour of the end of tube 60.

The bracket 106 projects upwardly from the plate 105, as illustrated in Figure 4, to suspend the roller 107 directed downwardly in the path of the end surface of the tube 60, contact being made at the upper element of the tube. See Figure 6. The lower end of the roller 107 is spaced above the surface of the plate 105, which permits the lower portion of the tube to pass below the roller 107 when it projects further than the upper portion in contact with the roller 107.

The tubes 50 and 60 as a unit are slid longitudinally of themselves in the respective holes 73 and 74, until the end of the tube 50 comes into engagement with the shank 38 of the cutter 17, at which time the nose 35 begins to cut into the end of the tube. The cutter 17 will continue to opposite ends of the cutter tool 17, and spaced apart by the cutter shank 38, facilitate fastening the cutter to the head 25. The tool shank 38 is ground away as shown, to provide the required undercut for the shear edge 36, 37, the extent of undercut determining the depth of cut.

When the cutting head is positioned in the machine, with one shear edge 36, 37 disposed in cutting position, the ledge of the other shear edge is engaged by the shoulder 41 of the hold down plate 42, which is attached to the head 25 by the set screw 43. The locating plate 44 engages the surface 39 of the cutter 17 opposite the hold-down plate 42, to fix the cutter in position in the head 25. The plates 42 and 44, cooperating with the key and keyway 32, hold the cutter 17 firmly attached to the head 25, and in turn are held in position by the sleeve 27, which is fixed to the head 25 by the set screw 40, Figure 17.

The plate 51, Figures 14 and 16, is attached to the top surface of the head stock 28, held in position by the screws 52 and 53. The plate 51 provides bearing surface for extension 31 opposite the nose 35 of tool 17, bearing contact being on the surface of the head 25. The plate 51 also locates the female die 18 in proper position relative the cutter 17, the set screws 53 operating to hold the die 18 in position.

The female die 18, as will be seen in Figures 14 and 16, presents its top surface as a rest for the work 50, the inside edge of the top surface of the die 18 presenting the shear edge 54, companion with the shear edge 36, 37 of the male die 17, and cooperating therewith in shearing action.

The female die presents a surface along its inside border companion to the surface 39 opposite the operative shear edges 36, 37, and by this means the die 18 supports the male die 17 against lateral thrust under shock of the cutting operation. It will be noted that the tool mounting, comprising the head 25, the attachment of the die 18, and the key and keyway 32 cooperating with the holding and locating plates 42 and 44 to hold the male die 17, presents a sturdy construction to enable the tool 16 to carry the shock of the cutting operation.

The plate 44 is notched, as illustrated in Figures 16 and 17, to receive chips as they fall, one with each downward stroke of the cutter 17. The chips fall from the plate 44 into and through the chute 45 in the headstock 28, onto the inclined bed 46 of the block 47, Figure 3. The block 47 is attached to the arm 23, as shown, together with the surrounding sleeve 48, which confines the chips to prevent their falling between moving parts where they can do damage. The set screw 34 holds the block 47 and the sleeve 48 fixed to the arm 23. The block 47 travels with the arm 23, causing the chips to ride down the inclined bed 46, until they are ejected through the aperture 49 in the sleeve 48.

The head stock 28 also supports one end of the pair of parallel ways 56, Figures 1 and 2, the opposite end of the parallel ways being supported by the base 55, which rests in fixed position on the bed plate 11.

The work is carried between the head rest, illustrated generally at 57, and the tail rest, illustrated generally at 58, Figures 1 and 2. The head and tail rests, 57 and 58, also carry the templet tube 60, which operates to control machining of the ends of work tube 50 to predetermined desired contours. The head and tail rests 57 and 58, respectively, hold the templet piece 60 and the work piece 50 in parallel relationship, directed towards the templet follower 15 and the tool 16, respectively.

The head stock 28 extends transversely of the machine, from front to rear thereof, Figure 2, and carries the brackets 61 and 62, at the front and rear respectively. The front bracket 61 carries the pin 63, Figure 1, and the rear bracket carries the pin 64, Figure 9. The pins 63 and 64 support the jaw member 67, attached thereto by the nuts 65. The spacer bushing 66 can be adjustably positioned on the pins 63 and 64 to locate the head rest 57 a predetermined greater or less distance from the head stock 28. The jaw member 68 is pivoted to the bracket 69 at 70, the bracket 69 being fixedly attached to the jaw member 67 in any suitable manner. See Figure 9. The latch 71, illustrated in open position in Figure 10 and in closed position in Figure 9, operates to hold the jaws 67 and 68 in closed position in engagement with each other.

The pair of jaws 67, 68 have holes 73 and 74, each hole comprising a semicircular notch in each of the jaw members 67 and 68. The holes 73 and 74 hold the work piece 50 and the templet piece 60, respectively, to maintain their head ends spaced apart a predetermined distance, and at a predetermined level. The hole 72 in the jaw member 67, which engages the pin 64, is slotted vertically to vary the height of the head rest 57, for slight adjustment of the level of tubes 50 and 60 which may be found necessary. The holes 73 and 74 are of sizes to hold the work 50 and the templet 60 against appreciable lateral movement in any direction, but are sufficiently oversized to permit rotation of the tubes, and longitudinal sliding in the holes.

It being contemplated under preferred practice of the invention that the templet be a previously machined work piece 50, the holes 73 and 74 are of the same size. A head rest 57 of proper sized holes 73 and 74 is provided for each different size tubing to be machined on the machine.

It is desirable that the head rest 57 be positioned as near as possible to the cutter 16, to minimize the tendency of the work piece 50 to chatter or push laterally under the force of the machining operation. The spacer bushings 66 allow for adjustment, to enable the head rest 57 to be positioned as near as possible to the tool for the maximum steadying, but as far away from the end of the tube 50 as is necessary to clear the machining, the range of adjustment possible with the bushings 66 being sufficient to clear the most extensive longitudinal contour to be machined.

The tail rest 58 comprises the pairs of jaws 81, 82 and 83, 84, Figures 11 and 12, which respectively hold the work piece 50 and the templet piece 60. The work and templet pieces 50 and 60 rest on the surface plate 85, and are engaged at their sides by the pairs of jaws 81, 82 and 83, 84. Jaws 81 and 83 comprise one member, and the jaws 82 and 84 another member, which members are mounted on the reversely threaded screw 86, rotatable manually by means of the knurled knob 87 to open or close the pairs of jaws 81, 82 and 83, 84 like amounts simultaneously. The reversely threaded screw 86 is bearinged in the housing bracket 88, which is mounted movable longitudinally of the parallel ways 56 to adjust the machine to accommodate any desired length of tubing. The bracket 88 is held in position of adjustment along the ways 56 by the clamping plate 89, which is fixed in clamping engagement with the parallel ways by the set screw 90.

The work and templet tubes, 50 and 60 respeccut a notch longitudinally of the tube until the end of the templet tube 60 engages the roller 107. Now the knurled nut 92 is rotated towards the operator to feed the tube 50 to the cutter 17. The tube 60 rotates in the same direction to a like amount, and simultaneously urged into engagement with the surface of the roller 107, the contour of the machining of tube 50 thus being controlled to be the same as the end of the tube 60.

One end of the tube 50 having been machined, both tubes and the intergearing 94 are removed from the head rest 57, and are repositioned therein in the reversed position, for machining the opposite end of the tube 50 in accordance with the contour of the corresponding end of tube 60. The adjustment of intergearing 94 has not been disturbed, and accordingly the tubes 50 and 60 continue in longitudinal adjustment relative to each other. Accordingly, tube 50 will be machined to the same length as tube 60. Also, the machining at opposite ends of tube 50 will be in the same circumferential registry as the opposite ends of tube 60.

It sometimes happens that the templet tube is machined slightly too short to fit in the assembly. The machine of the present invention is adjustable to obviate the necessity to remachine a new templet tube accurately to the right length. The carriage plate 105 is mounted slidable longitudinally of the machine, and of the tube 60. The stud 109, threaded into the head stock 28, carries the knurled nut 110, which includes a collar straddled by the fork 111 of the plate 105. See Figure 6. Rotation of the nut 110 advances the plate 105 in the guideways 112 and 113 of the guide plate 114, to adjust the position of the roller 107 longitudinally of the tube 60.

The guide plate 114 rests on the head stock 28, fixed thereto by the set screw 115, Figure 4. The slotted guideway 116 enables the guide plate to be moved transversely of the machine, in adjusted position nearer to or farther away from the cutter 17. By means of this adjustment the roller 107 can be positioned to contact the tube 60 a predetermined circumferential distance in one or the other direction from the upper dead center thereof. When the model tube 60 is found to be machined slightly out of circumferential registry at its opposite ends, the plate 114 can be relocated longitudinally of the guideway 116 to cause the roller 107 to contact the end of tube 60 a compensating distance away from upper dead center. By this means opposite ends of the tube 50 can be machined in accurate registry without the necessity of remachining the original templet to accurate registry.

A modified and simpler form of machining tool is illustrated in Figure 20, this being a less costly embodiment suitable for some classes of work.

The machining tool of Figure 20 comprises the male die 120, which is preferably cylindrical, and which is operated to reciprocate in the circular hole in the female die 121. The male die 120 is provided with the downwardly directed shearing edge 122, which cooperates with the shearing edge 123 of the female die 121. Opposite the shearing edges 122 and 123, the male and female dies present companion cylindrical surfaces 124 into engagement with each other, the bearing surfaces 124 operating to support the tool against the shock of the machining operation.

It will be noted that there is a relatively small mass of metal to withstand the shock of the cutting operation, and accordingly, in this embodiment it is usually advisable to elongate the end 126 of the male die beyond the shear edge 122, and to ride the end 126 in the supporting sleeve of the arm 127 which is mounted in fixed position on a stationary part of the machine in any suitable manner.

The tool of Figure 20 is suitable for machining tubes of large diameter and thin walls. The lower cost of the tool of Figure 20 warrants the modification.

Having described the nature of the invention in detail, it will be noted that the invention is not limited to the embodiments shown in the drawings, but its scope is determined by the accompanying claims.

I claim:

1. Apparatus for machining the end surfaces of a length of tubing to predetermined contours, comprising the combination of a tool operable around the tubing to machine the tubing ends, and means to control the machining operation in accordance with the desired contours, the control means comprising a tubular templet and a templet follower relatively movable in engagement with each other, and mechanism to direct the machining operation responsive to the relative movement between the templet and the follower.

2. Apparatus for machining a plurality of pieces of work to predetermined like contours, comprising the combination of a tool operable to machine the pieces individually, and control means comprising a templet and templet follower relatively movable in engagement with each other, means under manual control to direct machining of a given piece to the predetermined desired contour, means to operate the machined piece as the templet in the machine, and mechanism to direct the machining of subsequent pieces responsive to the relative movement between the machined piece and the follower to machine the several subsequent pieces to the same contour as the machined piece.

3. Apparatus for machining a plurality of pieces of work to predetermined like contours, comprising the combination of a tool operable to machine the pieces of work individually, and control means comprising a templet and templet follower relatively movable in engagement with each other, means under manual control to direct machining of a given piece to the predetermined desired contour, means to operate the machined piece as the templet in the machine, mechanism to direct the machining of subsequent pieces in accordance with the contour of the templet piece in response to the relative movement between the templet piece and the follower, and means operable when the machining of the templet piece is found inaccurate to adjust the control means to compensate for such inaccuracies and to machine subsequent pieces accurately to the desired contour in response to the relative movement between the inaccurate templet piece and the follower.

4. Apparatus for machining the opposite end surfaces of a length of tubing to predetermined contours having predetermined circumferential registry relatively to each other, the mechanism comprising the combination of a tool operable to machine the tube ends and means to control the machining operations in accordance with the desired contours, means to adjust the control means to determine that the machining operations at opposite ends of the piece are in desired circumferential registry.

5. Apparatus for machining the end surfaces of a length of tubing to predetermined contours and the tubing to predetermined length, the apparatus comprising the combination of a tool operable around the tubing to machine the tube ends and means to control the machining operations in accordance with the desired contours, means to adjust the control means to determine machining of the tubing to the desired length.

6. Apparatus for machining opposite ends of a work tube to predetermined desired contours, including means to repeat like operations on successive like tubes, the mechanism comprising the combination of a tool operable to machine the ends of work tubes, means to rotate the work tubes to feed the ends thereof to the tool, and means to control the machining operations in accordance with the desired contours, the control means comprising a templet and templet follower, the templet comprising a previously machined tube, the templet and templet follower being movable relative to each other with the follower in engagement with the end surface of the tube, intergearing between the templet tube and the work tube to rotate them in unison to machine the work tube responsive to the templet tube and follower.

7. Apparatus for machining the end surface of a tubular work piece to a predetermined desired contour, comprising a machining tool, a tubular templet piece like the work piece with an end contour corresponding with the desired contour of the work piece, a templet follower, and means supporting the work piece with its ends directed to the machining tool at one portion of its peripheral arc and the templet piece with its end directed to the follower at the corresponding opposite portion of its peripheral arc.

8. Apparatus for machining a piece of work, comprising a machining tool and means to feed the work to the tool, the tool comprising a female die and a male die longitudinally movable in shearing engagement therewith, the male die comprising a cutter head and an actuating shank, the cutter head comprising an elongated shear-cutting edge at its side extending from near the axis of the shank transversely thereof and a rounded nose with a cutting edge continuous with the side cutting edge, the nose being directed towards the work piece, the female die comprising a work support surface, the border thereof comprising a cutting edge companion to the continuous side and nose cutting edges of the male die, the cutting edges of the male and female dies being relatively positioned for shearing action when the male die is moved longitudinally of the axis of the shank.

9. Apparatus for machining the end surface of a tubular work piece, comprising a machining tool and means to feed the end of the work piece to the tool, the tool comprising a female die and a male die movable longitudinally in shearing engagement therewith, the male die comprising a cutter head and an actuating shank disposed transversely to the direction of the tube, the cutter head comprising an elongated shear-cutting edge at its side extending from near the axis of the shank transversely thereof terminating with a rounded nose with a cutting edge continuous with the side cutting edge, the nose being directed longitudinally of the tubular piece within the periphery thereof, the female die comprising a surface to support the work piece at its end, the border of the female die comprising a cutting edge companion to the continuous side and nose cutting edges of the male die, the cutting edges of the male and female dies being relatively positioned for shearing action when the male die is moved longitudinally of the axis of the shank.

10. A machining tool comprising a female die and a male die longitudinally movable in shearing engagement therewith, the male die comprising a cutter head and an actuating shank, the cutter head comprising an elongated shear-cutting edge at its side extending from near the axis of the shank transversely thereof and a rounded nose with a cutting edge continuous with the side cutting edge, the female die comprising a work supporting surface, the border thereof comprising a cutting edge companion to the continuous side and nose cutting edges of the male die, the cutting edges of the male and female dies being relatively positioned for shearing action when the male die is moved longitudinally of the axis of the shank.

11. A machining tool comprising a female die and a male die longitudinally movable in shearing engagement therewith, the male die comprising an actuating shank and a cutter head attached thereto at the end thereof, the cutter head comprising an elongated shear-cutting edge at its side extending from near the axis of the shank transversely thereof and a rounded nose with a cutting edge continuous with the side cutting edge, the continuous side and nose cutting edges being directed towards the shank, the female die comprising a work supporting surface, the border thereof comprising a continuous side and nose cutting edges companion to the cutting edge of the male die, the cutting edges of the male and female dies being relatively positioned for shearing action by the male die being pulled by the shank longitudinally of its axis.

12. A machining tool comprising a fixed member, a cutter head, and an actuating shank fixed to the cutter head, and reciprocable longitudinally of its axis relative to the fixed member, the cutter head comprising an elongated shear-cutting edge at its side extending from near the axis of shank transversely thereof and a rounded nose with a cutting edge continuous with the side cutting edge, the cutter head also comprising a bearing surface disposed opposite the continuous side and nose cutting edges, the fixed member comprising a bearing surface companion to the bearing surface of the cutter head, to support the tool against the shock of the cutting action.

13. A cutter comprising overhanging cutting edges spaced apart at opposite ends thereof, each cutting edge comprising a side portion and a nose portion, each side portion comprising an elongated shear-cutting edge extending from near the longitudinal axis of the cutter transversely thereof to the nose portion, the nose portion being rounded and extending continuous with the side cutting edge, each cutting edge being engageable to hold the cutter in operating position with the other cutting edge positioned for the cutting operation.

PAUL R. POWELL.